United States Patent
Barkley et al.

(10) Patent No.: US 10,972,765 B2
(45) Date of Patent: *Apr. 6, 2021

(54) CONDITIONING SEGMENTED CONTENT

(71) Applicant: Comcast Cable Communications, LLC, Philadelphia, PA (US)

(72) Inventors: James Barkley, Downingtown, PA (US); Walter Mlodzinski, Doylestown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/561,339

(22) Filed: Sep. 5, 2019

(65) Prior Publication Data

US 2019/0394505 A1 Dec. 26, 2019

Related U.S. Application Data

(63) Continuation of application No. 15/593,669, filed on May 12, 2017, now Pat. No. 10,448,065.

(51) Int. Cl.
*H04N 21/234* (2011.01)
*H04N 21/845* (2011.01)
*H04N 21/81* (2011.01)
*H04N 21/2343* (2011.01)

(52) U.S. Cl.
CPC ........... *H04N 21/23424* (2013.01); *H04N 21/234345* (2013.01); *H04N 21/812* (2013.01); *H04N 21/8456* (2013.01)

(58) Field of Classification Search
None
See application file for complete search history.

(56) References Cited

U.S. PATENT DOCUMENTS

| 8,495,675 | B1 | 7/2013 | Philpott et al. |
| 8,863,182 | B1 | 10/2014 | Sharifi et al. |
| 2003/0204613 | A1 | 10/2003 | Hudson et al. |
| 2010/0150527 | A1* | 6/2010 | Sandoval ............... H04N 5/76 386/291 |
| 2012/0047542 | A1 | 2/2012 | Lewis et al. |
| 2012/0185895 | A1 | 7/2012 | Wong et al. |
| 2012/0198089 | A1* | 8/2012 | Dhruv ............. H04N 21/26258 709/231 |
| 2012/0198492 | A1* | 8/2012 | Dhruv ............. H04N 21/23424 725/32 |
| 2013/0262693 | A1 | 10/2013 | Phillips et al. |
| 2013/0282915 | A1* | 10/2013 | Patel ................... H04L 65/602 709/231 |

(Continued)

OTHER PUBLICATIONS

Extended European Search Report dated Jun. 26, 2018; EP Application No. 18171505.3-1208; European Patent Office; Munich, Germany; (8 pages).

*Primary Examiner* — Alexander Q Huerta
(74) *Attorney, Agent, or Firm* — BakerHostetler

(57) ABSTRACT

Methods and systems are described herein for inserting placement opportunities into content assets. A content distributor may receive a content asset comprising a plurality of content fragments. The content distributor may be further configured to adjust a playback duration of a portion of the content fragments so that the placement opportunity may be inserted at the content asset fragment boundaries.

34 Claims, 9 Drawing Sheets

(56) References Cited

U.S. PATENT DOCUMENTS

| | | | |
|---|---|---|---|
| 2014/0013349 A1* | 1/2014 | Millar | H04N 21/44016 725/32 |
| 2014/0344852 A1 | 11/2014 | Reisner et al. | |
| 2015/0082349 A1* | 3/2015 | Ishtiaq | H04N 21/4884 725/40 |
| 2015/0095461 A1 | 4/2015 | McGowan et al. | |
| 2015/0095511 A1* | 4/2015 | McGowan | H04N 21/44016 709/231 |
| 2015/0278884 A1* | 10/2015 | Manzari | G06Q 30/02 705/14.73 |
| 2016/0080470 A1* | 3/2016 | Shanson | H04N 21/8455 709/219 |
| 2016/0277776 A1 | 9/2016 | Park et al. | |
| 2016/0345074 A1 | 11/2016 | Serbest et al. | |
| 2016/0360244 A1* | 12/2016 | Einarsson | H04N 21/458 |
| 2017/0171578 A1 | 6/2017 | Joong et al. | |
| 2017/0264923 A1* | 9/2017 | Lacivita | G11B 27/102 |
| 2018/0035152 A1 | 2/2018 | Jassin et al. | |
| 2018/0062910 A1 | 3/2018 | Broome et al. | |
| 2019/0132627 A1* | 5/2019 | Loheide | H04N 21/4583 |

* cited by examiner

CONDITIONING SEGMENTED CONTENT

RELATED APPLICATIONS

This application is a continuation of U.S. patent application Ser. No. 15/593,669, filed on May 12, 2017, the entirety of which is incorporated herein by reference.

BACKGROUND

Content delivery systems may allow users to select and watch content, such as content assets, at the time of their choice rather than having to wait for a specific broadcast time. Content assets may comprise placement opportunities as an indication of an insertion point for the other content. In some cases, the content asset may be provided to the content distributor with an existing placement opportunity. In contrast, in certain content delivery systems, the content assets and information indicating the placement opportunities may be generated as separate files and may be delivered at different times. As such, processing of the content asset for transmission to an end user may be delayed until after the placement opportunities are made available to the content distributor, resulting in a delay in viewing the content and decreased customer satisfaction.

SUMMARY

Methods and systems for inserting information such as placement opportunities into content assets are described herein. A content distributor may be configured to receive a content asset and to divide the content asset into a plurality of content fragments. However, placement opportunities may be generated separately from the content fragments. As such, information associated with advertising opportunities in the content asset may be received by a content distributor separately from the content asset. Upon receiving the information associated with placement opportunities, the content distributor may be configured to adjust a playback duration of only a portion of the content fragments so that the time at which the asset fragment starts, also known as the content asset fragment boundary, is shifted in order to align with the placement opportunity. Supplemental content may be inserted into the content asset without causing a delay in the content delivery and/or playback. Such a selective adjustment (e.g., regrooming, conditioning, etc.) of the portion of the asset may minimize or eliminate the need to reprocess the entire content asset in order to incorporate the placement opportunities. The number of content fragments adjusted for the placement opportunity may be small compared to the total number of content fragments. As an example, pairs of content fragments adjacent a placement opportunity may be adjusted, while the remaining content fragments are maintained in their original encoding or formatting (e.g., uniform playback duration). The content distributor may be configured to generate a manifest associated with the content asset, and to update the manifest upon receiving a placement opportunity.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION OF ILLUSTRATIVE EMBODIMENTS

Methods and systems are described for inserting placement opportunities such as advertising opportunities into content assets. Content assets may comprise advertising opportunities as an indication of an insertion point for advertisements. The content asset may be divided into a plurality of content fragments, and only a portion of those fragments may need to be processed in order to incorporate the received advertising opportunity. Processing of a portion of the content fragments may comprise adjusting a playback duration of the portion of fragments such that the adjusted fragment boundaries align with the advertising opportunity. The advertising opportunity may be inserted into the adjusted fragment boundaries without the need to reprocess the entire content asset.

Figure 1:
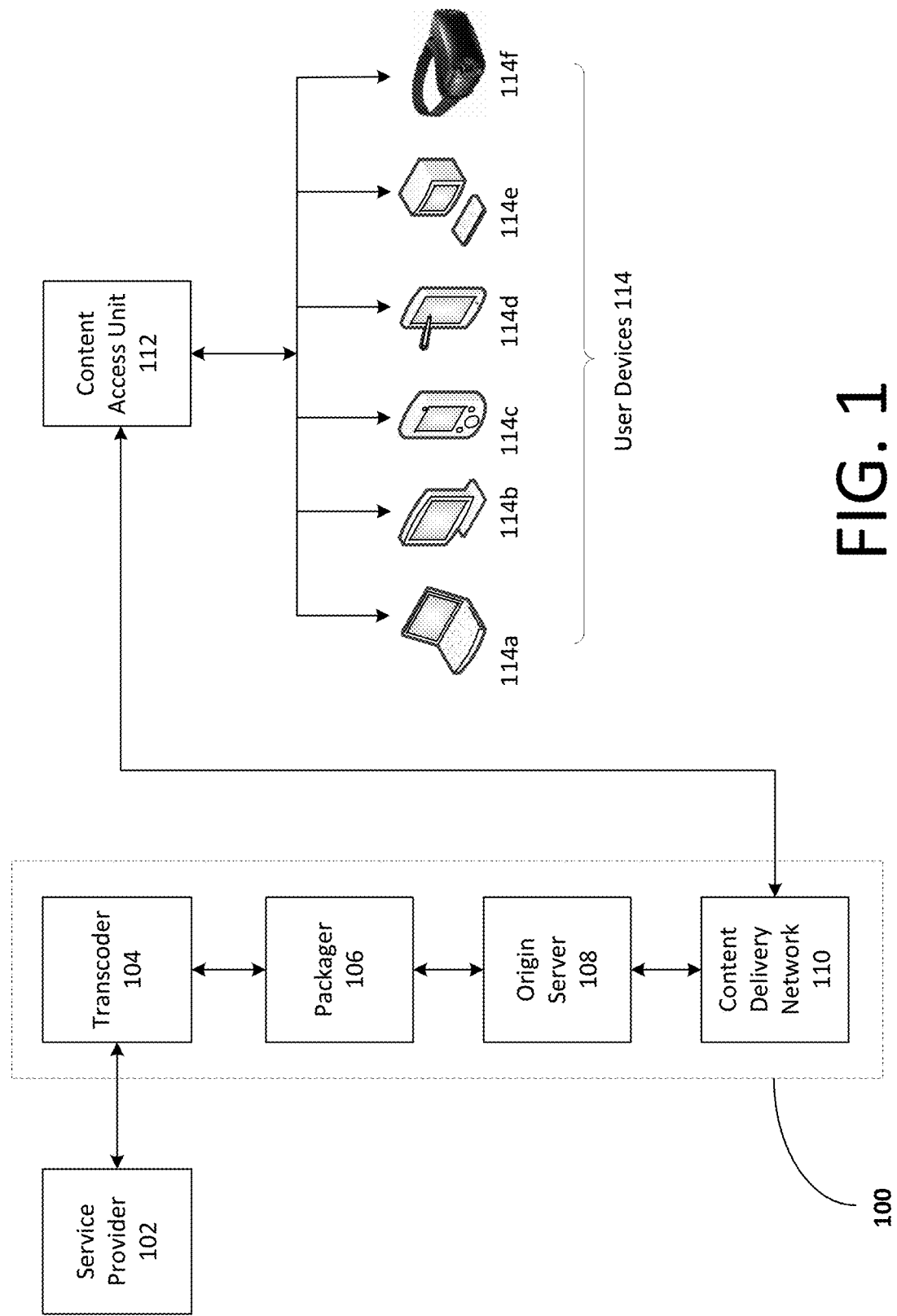
FIG. 1 shows a block diagram of a system in accordance with aspects of the disclosure.

FIG. 1 shows an example system 100 by which a content distributor 102, such as a content provider (e.g., Internet content distributor, cable television content distributor, etc.), may insert an advertising opportunity into a content asset. The content asset may comprise, for example, a video asset made available by a content distributor. The content distributor 102 may be configured to receive an advertising opportunity to be inserted into the content asset. The advertising opportunity may indicate a point in playback at which supplemental content such as an advertisement may be inserted into the content asset. The advertising opportunity may be received, for example, from an advertising company, or may be generated by the content distributor itself.

The content distributor 102 may be configured to receive a content asset. The content distributor 102 may be configured to divide the content asset into a plurality of content fragments. For example, a thirty-minute television show may be divided into 900 fragments such that each content asset fragment represents two-seconds of content. Certain fragmenting standards and formats may be used to result in fragments with generally uniform playback duration (e.g., 2 seconds, 10 seconds, etc.). The content distributor 102 may be configured to process a portion of the content fragments such as conditioning one or more of the divided content fragments. For example, processing a portion of the content fragments may comprise adjusting a playback duration of a portion of the content fragments such that the portion of the content fragments have a playback duration greater or less than the playback duration (e.g., two seconds) of each of the remaining fragments comprised in the content asset. The portion of the content fragments that are adjusted may comprise pairs of content fragments disposed adjacent an advertising opportunity. The content distributor 102 may be configured to insert the advertising opportunity (e.g., an indication of the advertising opportunity) in a determined location of the content fragments. The location of the advertising opportunity in the content asset may be received by the content provider with the information associated with the advertising opportunity.

The system 100 may comprise a transcoder 104. An input of the transcoder 104 may receive the content asset and one or more advertising opportunities from one or more sources, such as content distributor 102, while an output of the transcoder 104 may transmit the transcoded content asset and advertising opportunity to a packager 106. The transcoder 104 may be configured to convert the content asset, for example, from one video format to another video format, such as one amenable to the means by which the content distributor's users view the content. The content asset may be in any one of a variety of formats, such as, for example, H.264, MPEG-4 Part 2, or MPEG-2. The content asset may be transmitted using one or more standards such as SCTE 35 or other specifications.

Digital audio/video compression may be used, such as MPEG, or any other type of compression. Although reference may be made to example standards (e.g., MPEG) and formats, one of skill in the art will recognize that the systems and methods described herein are applicable to any format or standard that support audio and/or video. As an example, the Moving Pictures Experts Group (MPEG) was established by the international Standards Organization (ISO) for the purpose of generating standards for digital audio/video compression. The combined MPEG-1, MPEG-2, and MPEG-4 standards are hereinafter referred to as MPEG. In an MPEG encoded transmission, content and other data are transmitted in packets, which collectively make up a transport stream. The present methods and systems may employ transmission of MPEG packets. However, the present methods and systems are not so limited, and may be implemented using other types of transmission and data.

The output of a single MPEG audio and/or video codec may be referred to as a transport stream. The transport stream may comprise one or more elementary streams. An elementary stream may be or comprise an endless near real-time signal. For convenience, the elementary stream may be broken into data blocks of manageable size, forming a packetized elementary stream (PES). These data blocks need header information to identify the start of the packets and must include time stamps because packetizing disrupts the time axis. For transmission and digital broadcasting, for example, several programs (e.g., content assets) and their associated PESs may be multiplexed into a multi program transport stream. A multi program transport stream has a program clock reference (PCR) mechanism that allows transmission of multiple clocks, one of which may be selected and regenerated at the decoder.

A multi program transport stream may comprise a multiplex of audio and video PESs. In addition to the compressed audio, video and data, a transport stream may comprise metadata describing the bit stream. Such metadata may comprise a program association table (PAT) that lists every content asset (e.g., program) in the multi program transport stream. Each entry in the PAT may point to a program map table (PMT) that lists the elementary streams making up each content asset. Some content may be unencrypted, but some content may be subject to conditional access (encryption) and this information is also carried in the metadata. The transport stream may be comprised of fixed-size data packets, for example, each containing 188 bytes. Each packet may carry a program identifier code (PID). Packets in the same elementary stream may all have the same PID, so that the decoder (or a demultiplexer) may select the elementary stream(s) it wants and reject the remainder. Packet continuity counts may ensure that every packet that is needed to decode a stream is received. A synchronization system may be used so that decoders may correctly identify the beginning of each packet and deserialize the bit stream into words.

A content asset, such as a program, may be a group of one or more PIDs that are related to each other. For instance, a multi program transport stream used in digital television might contain three programs, to represent three television channels. In some examples, each channel may comprise one video stream, one or two audio streams, and any necessary metadata. A receiver wishing to tune to a particular "channel" merely has to decode the payload of the PIDs associated with its program. The receiver may discard the contents of all other PIDs.

The transcoder 104 may comprise a fragmentor configured to divide (e.g., segment) the content asset (such as in the event that the program has not yet been segmented) into a plurality of content fragments, or to re-segment the content asset (such as in the event that the program had been previously segmented) based on the received information associated with the advertising opportunity. For example, a content asset may be segmented into a series of two-second fragments, ten-second fragments, or other fixed or variable time fragments. The terms "fragment" and "segment" may refer to any portion of a content asset and may be used interchangeably herein. It is understood that the fragmentor or functionality associated with the fragmentor may be separate from the transcoder 104.

The system 100 may comprise a packager 106. An input of the packager 106 may receive the transcoded content asset and advertising opportunity from the transcoder 104 or other source, while an output of the packager 106 may transmit a packaged content asset with inserted advertising opportunities to an origin server 108. The packager 106 may be, for example, a VOD packager. The packager 106 may be configured to insert the advertising opportunity into the content asset fragment boundaries, as discussed herein. The packager 106 may receive the divided content asset and the advertising opportunity from the transcoder 104, insert the one or more advertising opportunities into the content asset, and organize the plurality of content fragments into a packaged content asset. The packaged content asset may be transmitted to a recipient device to facilitate playback. As such, the recipient device may process the packaged content asset and may be directed to access or receive an advertisement at certain points during playback, such as the advertisement opportunities inserted into the content asset.

The packager 106 may be configured to generate a manifest file associated with the content asset. Generally, a manifest file may contain information describing various aspects of the associated content asset that may be useful for the device 114 to playback the content asset and/or for the content distributor 102 to store and retrieve the program. For example, a manifest file may indicate each of the plurality of content fragments, the playback duration of each fragment, the number of fragments, and/or the proper ordering of the fragments necessary to effectuate a playback of the content asset. A manifest file may comprise a network location (e.g., a hyper-text transfer protocol (HTTP) uniform resource locater (URL) link or other universal resource identifier (URI)) for each fragment from which the fragment may be downloaded, accessed, or retrieved. It will be appreciated that the network locations included within a manifest file may point to more than one different location or source. A manifest file may be provided to any of the devices 114 in response to a request to receive a program. The device 114 may use the manifest file to determine the fragments required to play the program or a portion of the program and subsequently download the required fragments using the network locations specified in the manifest file.

The origin server 108 may receive as an input the packaged content asset from the packager 106. The origin server 108 may be configured to receive and fulfill a request from any of the user devices 114, via the content delivery network 110, to deliver a content asset to the device 114 for playback. The request from the device 114 to deliver the content asset may comprise identifications of the user (e.g., an account identifier, a username and/or a password), the device 114, the requested content asset, and/or a playback time point or temporal location. In certain aspects, the request to deliver the content asset may reflect a user skipping to a particular portion of a content asset of which the initial segments of the content asset have already been delivered and are being played on the device 114. Upon receiving a request to deliver a content asset to the device 114, the origin server 108 may provide one or more manifest files to the device 114 via the content delivery network 110 that describe the program and segments thereof, including network locations from which each segment may be downloaded. Using the manifest file, the device 114 may iteratively download and begin playback of the content asset.

The content delivery network (CDN) 110 may be configured to act as an intermediary server located between the user devices 114 and the content distributor 102. More particularly, the CDN 110 may serve cached objects to client device 114 and may manage some or all aspects of the cached objects of client device 114. Such architecture may reduce the cost, resource, and bandwidth usage and may improve the security of user device 114. For example, instead of validating the cached objects by committing various resources and using bandwidth to connect to a plurality of network-based resources, user device 114 needs only to request the validation from the content delivery network 110. In turn, the content delivery network 110 may connect to the plurality of network-based resources, such as the origin server 108, to refresh the cached objects, and return the refreshed objects to user device 114.

The content access unit 112 may be configured to receive as an input a request to access content from the content distributor 102 via the plurality of user devices 114. The content access unit 112 may be, for example, a VOD device. As shown in FIG. 1, a user device may comprise, for example, at least one of a laptop 114a, a television 114b, a smartphone 114c, a tablet 114d, a desktop 114e, a VR headset 114f, or any other device capable of presenting content to a user. The user may interact with the content distributor 102 via a user interface associated with the content access unit 112. Upon this interaction, the content asset may be delivered to a user device, such as any of the user devices 114 shown in FIG. 1, for playback. As used herein, the content access unit 112 may comprise any combination of a hardware element, such as a set-top cable box, a streaming-video player, or a quadrature amplitude modulation (QAM) client, or a software element, such as a web browser or other software adapted to playback video.

Figure 2:
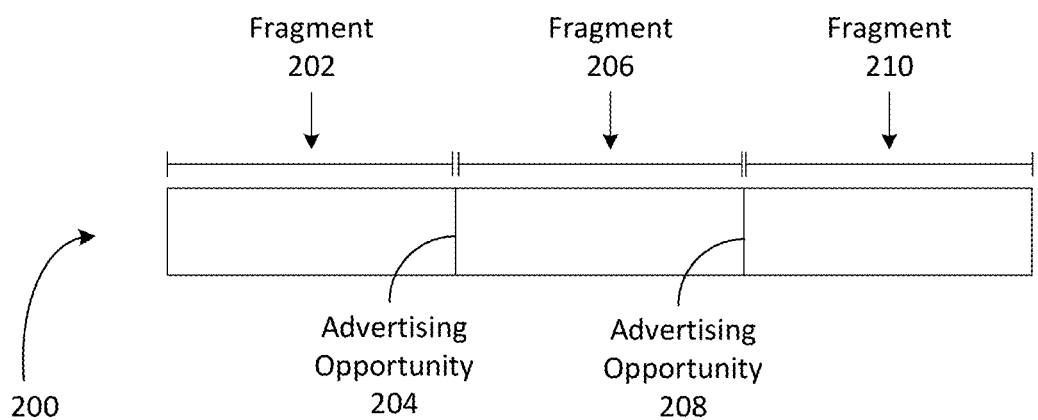
FIG. 2 shows an example content asset in accordance with Internet Protocol (IP) Delivery systems.

FIG. 2 shows an example content asset 200 provided by content distributor 102. The content asset 200 may comprise a plurality of content fragments which have been processed based on the known location of the advertising opportunities. The content asset 200 may utilize, for example, an Internet Protocol (IP) delivery mechanism. The content asset may be divided into a plurality of content fragments, such as content fragments 202, 206, and 210 shown in FIG. 2. Each of the content fragments 202, 206, 210 may have an equal playback duration, for example, two-seconds. Segmenting of the content assets into a plurality of content fragments, as shown in FIG. 2, may be performed, for example, by the fragmentor associated with the transcoder 104, shown in FIG. 1, in order to rebalance the use of the network resources based on the number of customers available to the content distributor. Fragments when combined with multiple bitrates may reduce strain on the network and allow the content distributor to connect to a larger customer base. Smaller content fragments may allow the content distributor to react quickly to changes in demand on the network. On the other hand, generating content assets that are too short may result in too much time spent on requesting a new file.

The content distributor 102 may be configured to provide to a user one or more advertising opportunities, such as the advertising opportunities 204 and 208 shown in FIG. 2. An advertising opportunity, as shown in FIG. 2, may be inserted by the content distributor 102 before or after any one of the content fragments 202, 206, and 210. For example, FIG. 2 shows a content asset comprising a content asset fragment 202, followed by an advertising opportunity 204, a second content asset fragment 206, followed by a second advertising opportunity 208 and a third content asset fragment 210. Each content asset fragment may comprise multiple content fragments and may comprise, for example, a video asset, an audio asset, or a combination of the two, as discussed herein.

The content distributor 102 may be configured to provide a manifest to a user of the IP delivery system. The manifest may be provided, for example, by the packager 106, as discussed herein. In addition to identifying all of the files that make up the content asset, the manifest may also comprise information associated with the opportunities to insert or replace advertisements in the content assets. Insertion of advertising opportunities in IP delivery is generally easy because the fragment boundaries are aligned with the advertising opportunities.

In example content delivery systems, such as, for example, video on demand (VOD) systems, the content asset and the advertising opportunity may be separate files received by a content distributor, such as content distributor 102, at different times. This may be a problem for the content distributor, who may wish to process the content asset and the advertising opportunity together and allow them to be viewed at the beginning of the license window. For example, providing the content asset may be highly biased to the start of the license window, which represents the time that a content distributor may offer the content asset to customers, such as any of the user devices 114 shown in FIG. 1. In order to meet these needs, content distributors may choose to process the content asset without knowing the locations of the advertising opportunities. The content distributor may make the content asset available to customers without the advertising opportunity. When the advertising opportunities are delivered to the content distributor at a later time, the advertising opportunities may be adjusted to the existing segment boundaries. However, if the received advertising opportunity identifies an advertisement insertion location that is outside of the existing segment boundaries, the content asset may be presented in an undesirable fashion.

Figure 3:
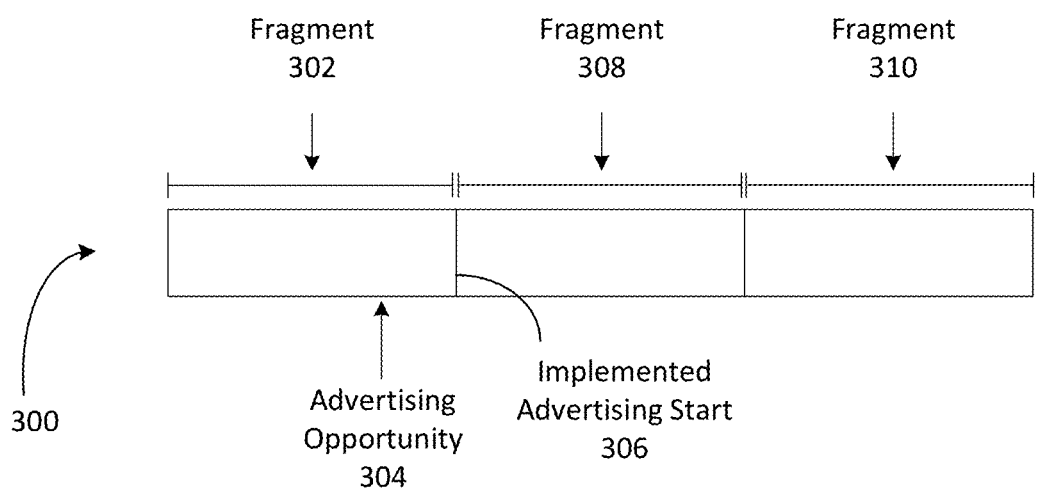
FIG. 3 shows an example content asset comprising an advertising opportunity implemented outside of an advertising start time.

As shown in FIG. 3, the content asset processed prior to receiving an advertising opportunity may comprise three content fragments: asset fragment 302, asset fragment 308, and asset fragment 310. The content distributor may choose to segment the content asset into a plurality of content fragments in order to provide the customer with the content asset either without an advertising opportunity or with an old advertising opportunity received by the content distributor prior to receiving the content asset. The content asset, as originally processed, may identify an implemented advertising start time 306 after content asset 302. However, the advertising opportunity may indicate that the advertisement is to be inserted at a location that does not align with the fragment boundaries. This may result in the advertising opportunity interrupting the content asset fragment, leading to user dissatisfaction that a portion of the content asset has been replaced by advertisements. If the received advertising opportunity identifies an advertisement replacement, some portion of the original advertisement may be presented. Additionally or alternatively, the advertising opportunity may not be played until the implemented advertising start time 306, leading to a portion of the advertising opportunity being cut off. This may result in dissatisfied advertisers and a reduction in advertising profits for the content distributor.

As discussed herein, the content asset may be processed twice, a first time when the content asset is received and a second time the advertising opportunity is received. This process may allow the content asset to be offered as soon as possible, while still allowing the content distributor to insert advertising opportunities as needed. However, there are costs and time delays associated with processing of the content asset multiple times.

Additionally or alternatively, the content asset may be withheld from users by the content distributor 102 until the advertising opportunity is received. This may prevent the content distributor from facing the problems discussed herein, including the associated costs and time delays. However, this may also result in a reduced number of the total views as customers may be displeased with the unpredictable delay in viewing the content. By choosing to wait until the advertising opportunity has been received to process the content asset to make it available to users, content distributors may suffer a potential loss of revenue.

Figure 4:
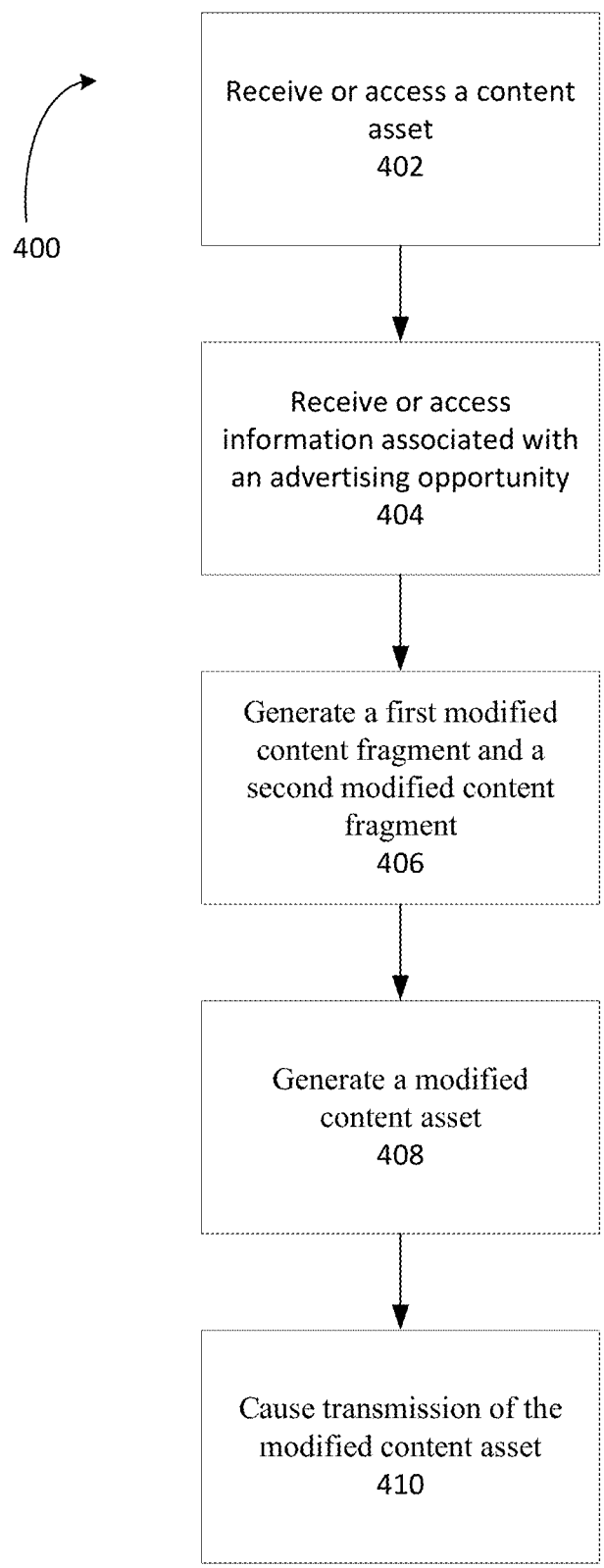
FIG. 4 shows a flow chart of an example method in accordance with aspects of the disclosure.

FIG. 4 shows a flow chart for an example method 400 for inserting advertising opportunities into an existing content asset. As shown at step 402 of FIG. 4, a content asset may be received or accessed, for example, by the content distributor 102 shown in FIG. 1. The content asset may be a video asset, an audio asset, or any type of media asset or any combination thereof. The content asset may comprise an MPEG transport stream. The content asset may be received by the content distributor 102 without an advertising opportunity. The content asset may comprise a plurality of content fragments. Additionally or alternatively, the content asset may be divided into a plurality of content fragments. Each of the content fragments may present a portion of the content asset and may have an equal playback duration, for example, two-seconds. Segmenting of the content asset into a plurality of content fragments may be performed, for example, by the fragmentor associated with the transcoder 104 shown in FIG. 1. The content asset may be divided into a plurality of content fragments in order to allow for lower bitrates and to allow the content distributor to react quickly to changes in demand on the network.

At step 404, information associated with an advertising opportunity may be received or accessed by the content provider 102. The advertising opportunity may be received, for example, by the content distributor 102 at a time that is different from when the content asset was received. The information associated with the content asset may comprise information indicating a location in the content asset to insert the advertising opportunity. For example, the information associated with the advertising opportunity may contain instructions to insert the advertising opportunity ten minutes into the content asset. The information associated with the advertising opportunity may be specific to a user requesting playback of the content asset, for example, any of the user devices 114 shown in FIG. 1. For example, the content distributor 102 may determine that Advertising Opportunity A should be associated with User A, while Advertising Opportunity B should be associated with User B.

At step 406, a first modified content fragment having a first playback duration and a second modified content fragment having a second playback duration may be generated. The first playback duration may be different than the second playback duration. In one embodiment, the playback durations of the content fragments may be adjusted, for example, so that one or more advertising opportunities may be inserted into the content asset without interrupting the content or resulting in the content being displayed in an unfavorable manner. For example, in response to the received instructions indicating that the advertising opportunity should be inserted ten minutes into the content asset, the content distributor, via the fragmentor associated with the transcoder 104, may adjust a playback duration of a first two-second asset fragment immediately preceding the ten minute mark in the content asset as well as a playback duration of a second two-second fragment immediately after the ten minute mark in the content asset. The first modified content fragment may have playback duration of one second, while the second content fragment may have a second playback duration of three seconds.

At step 408, a modified content asset comprising the first modified content fragment, the second modified content fragment, and the advertising opportunity may be generated. The first content fragment and the second content fragment may comprise less than one percent of the plurality of content fragments. For example, a thirty-minute content asset may comprise 900 two-second content fragments. Rather than reprocess entire file, the content distributor may be configured to identify the fragment in which the advertising opportunity occurs and reprocess that fragment. If a content distributor wanted to insert, for example, four advertising breaks into the content asset, only eight content fragments would need to be processed, less than one percent of the total number of content fragments.

Adjusting the playback duration of the first content fragments and the playback duration of the second content fragments may comprise removing a portion of the content from the first content fragments and inserting the portion of the content from the first content fragments into the second content fragments. Using the example above, adjusting a playback duration of a two two-second asset fragment may comprise removing a one-second portion from the first content fragments and inserting the one-second portion into the second content fragments. Thus, the adjusted playback duration of the first content fragments may be one-second while the adjusted playback duration of the second content fragments may be three-seconds.

At step 410, the modified content asset may be transmitted. As shown herein, a plurality of content fragments having an equal playback duration, the first adjusted content fragments, the second adjusted content fragments, and the advertising opportunity may be sent to a user, such as any of the user devices 114 shown in FIG. 1.

Content distributors, using the methods above, may perform a mixture of advertising opportunity replacement and advertising opportunity insertion. For example, an advertising opportunity included in a first broadcast in VOD may be stale after a certain period of time, for example, months later. Using the methods described herein, a content asset, such as a video asset, may be formatted and an advertising opportunity may be seamlessly inserted into the content asset without the need to reprocess the entire content asset.

Each of the plurality of content fragments may start with a self-contained frame. For example, this may be an IDR-frame in MPEG-4 nomenclature, or an I-frame in MPEG-2 nomenclature, that does not require any other previous video data to display. Additionally or alternatively, each audio segment may start with an audio access unit that does not require any previous audio data to begin to play. As discussed herein, when the processing is done in absence of the information of the knowledge of the advertisement opportunities, it is extremely unlikely that advertisement opportunities will align with the segment boundaries. Re-processing the entire content asset is possible, but time consuming. Since the fragments are already meant to be independent of each other, it is possible to restrict the reprocessing to just the fragments that contain the advertising opportunity, as discussed herein. Since the advertising opportunity does not have any effect on the remaining content fragments, there is no need to waste time and resources reprocessing the entire content asset.

Figure 5:
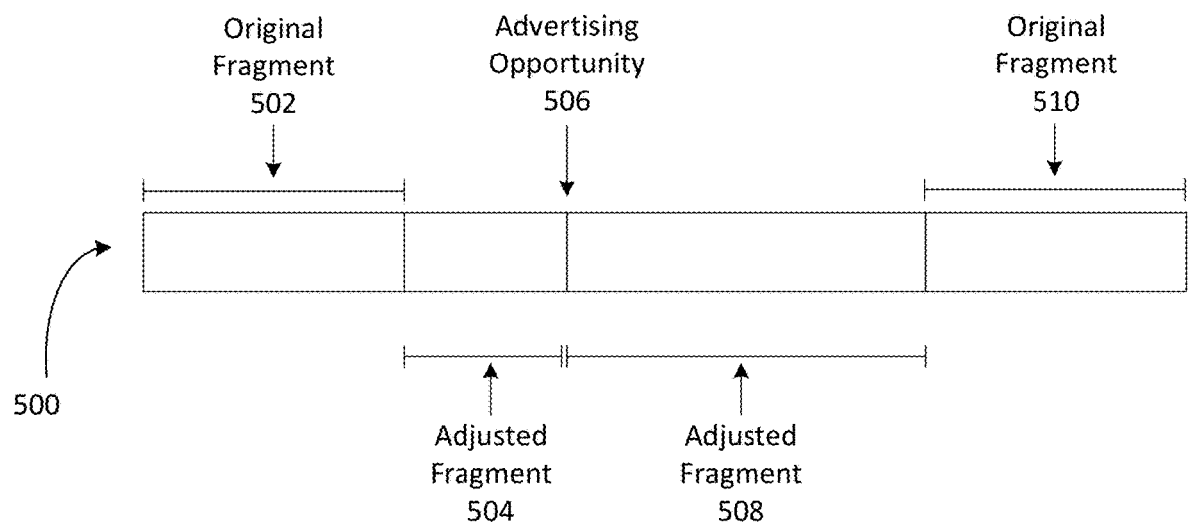
FIG. 5 shows an example content asset in accordance with aspects of the disclosure.
Figure 6:
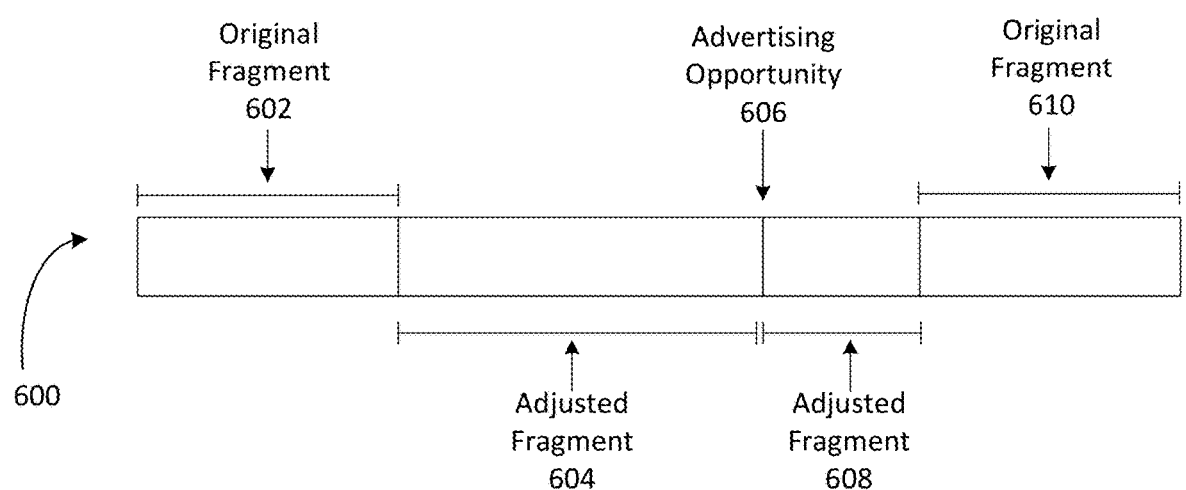
FIG. 6 shows an example content asset in accordance with aspects of the disclosure.

FIGS. 5 and 6 show example content assets provided, for example, by content distributor 102, utilizing the content delivery mechanism described herein. As shown in FIG. 5, when information associated with an advertising opportunity is received, for example, by the content distributor 102 shown in FIG. 1, the information is analyzed to determine the location of the advertising opportunity in the content asset. Instead of processing the entire content asset, only the content fragments immediately before and immediately after the location where the advertising opportunity will be inserted are processed. Thus, in an example where a content asset comprises four content fragments and one advertising opportunity, only two of the content fragments need to be processed.

As shown in FIG. 5, the processed content asset may comprise original asset fragment 502, adjusted asset fragment 504, advertising opportunity 506, adjusted asset fragment 508, and original asset fragment 510. This allows the advertising opportunity to be seamlessly integrated with the content asset without the need to re-process the entire content asset, thus saving considerable time and money.

For example, suppose that in FIG. 5, each of the plurality of content fragments is two seconds long prior to being adjusted for advertisement insertion. The first fragment may span from 0-2 seconds, the second fragment from 2-4 seconds, the third fragment from 4-6 seconds, and the fourth fragment from 6-8 seconds. Since only one advertising opportunity is to be inserted in the content asset after the second asset fragment, only that fragment and the fragment immediately following the advertising opportunity may need to be processed. The fragments may be processed, for example, by 50%. Thus, the final result may be an original first fragment from 0-2 seconds, an adjusted fragment from 2-3 seconds followed by the advertising opportunity, a second adjusted fragment from 3-6 seconds, followed by a second original fragment from 6-8 seconds.

Processing the content asset as demonstrated in FIGS. 5 and 6 may allow a content distributor to present the content asset as soon as the license window begins, whether an advertising opportunity has been provided or not. Once the advertising opportunity is provided to the content distributor, the content distributor may reprocess only a portion of the content fragments as described in connection with FIGS. 5 and 6. This allows the content distributor to get the content to the customers as soon as possible, while being able to reprocess the content asset with minimal time and money.

Figure 7:
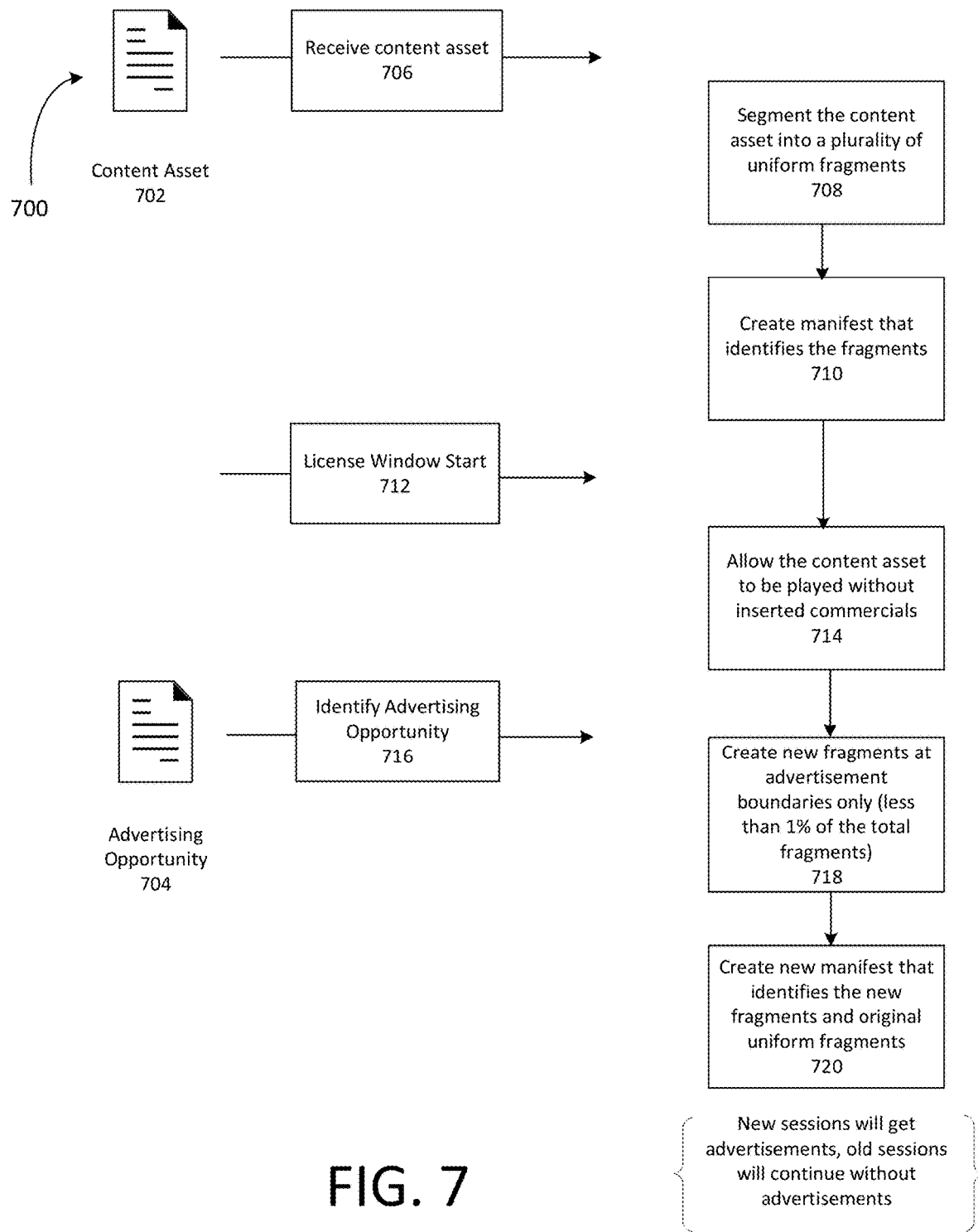
FIG. 7 shows a flow chart of an example method in accordance with aspects of the disclosure.

Examples of benefits associated with processing only a portion of the content fragments may be further understood in connection with FIG. 7. A content distributor, such as content distributor 102 shown in FIG. 1, may be configured to receive a content asset 702, as shown at step 706. The content asset 702 may be converted, for example, from one video format to another video format, such as one amenable to the means by which the content distributor's users view the content, by the transcoder 104, as discussed herein in connection with FIG. 1. The content asset 702 may be in the form, for example, of an MPEG package.

As shown at step 708, the content distributor may segment the content asset into a plurality of content fragments, as shown at step 708. Segmenting the content asset may comprise dividing the content asset into a plurality of content fragments each having an equal playback duration. For example, a thirty minute content asset may be segmented into approximately 900 content fragments each having an equal playback duration of two seconds.

In one example, before the start of the license window or receiving the advertising opportunity, the content distributor may be configured to generate a manifest that identifies the plurality of content fragments, as shown at step 710. The manifest may identify the number of content fragments, an ordering of the content fragments, and a file name for each of the content fragments.

At step 712, the license window may begin, allowing the content distributor 102 to provide the content asset to the plurality of user devices if the content distributor has still not received an advertising opportunity, the content distributor may be configured to allow the content asset to be played without inserted commercials, as shown at step 714. Using the methods discussed herein, the content asset may be segmented and provided to the plurality of user devices without worrying about extra time and expenses normally associated with having to process the content asset multiple times.

At step 716, the content distributor may receive an advertising opportunity. At this point, the content distributor may reprocess the content asset such that the content asset comprises the advertising opportunity. Reprocessing the content asset may comprise generating new segments at the advertising boundaries only, as shown at step 718. For example, this may comprise processing a first content fragments and a second content fragments and inserting the advertising opportunity at the boundary between the first content fragments and the second content fragments, as discussed herein in connection with FIG. 4. The processed fragments may comprise only a portion of the total number of content fragments.

At step 720, the content distributor may be configured to generate a new manifest that identifies the new fragments and the original uniform fragments. The new manifest may identify a playback duration of the first content fragments, a playback duration of the second content fragments, as well as playback duration of the advertising opportunity. The new manifest may comprise metadata for at least one of the first content fragments, the second content fragments, and the advertising opportunity.

Figure 8:
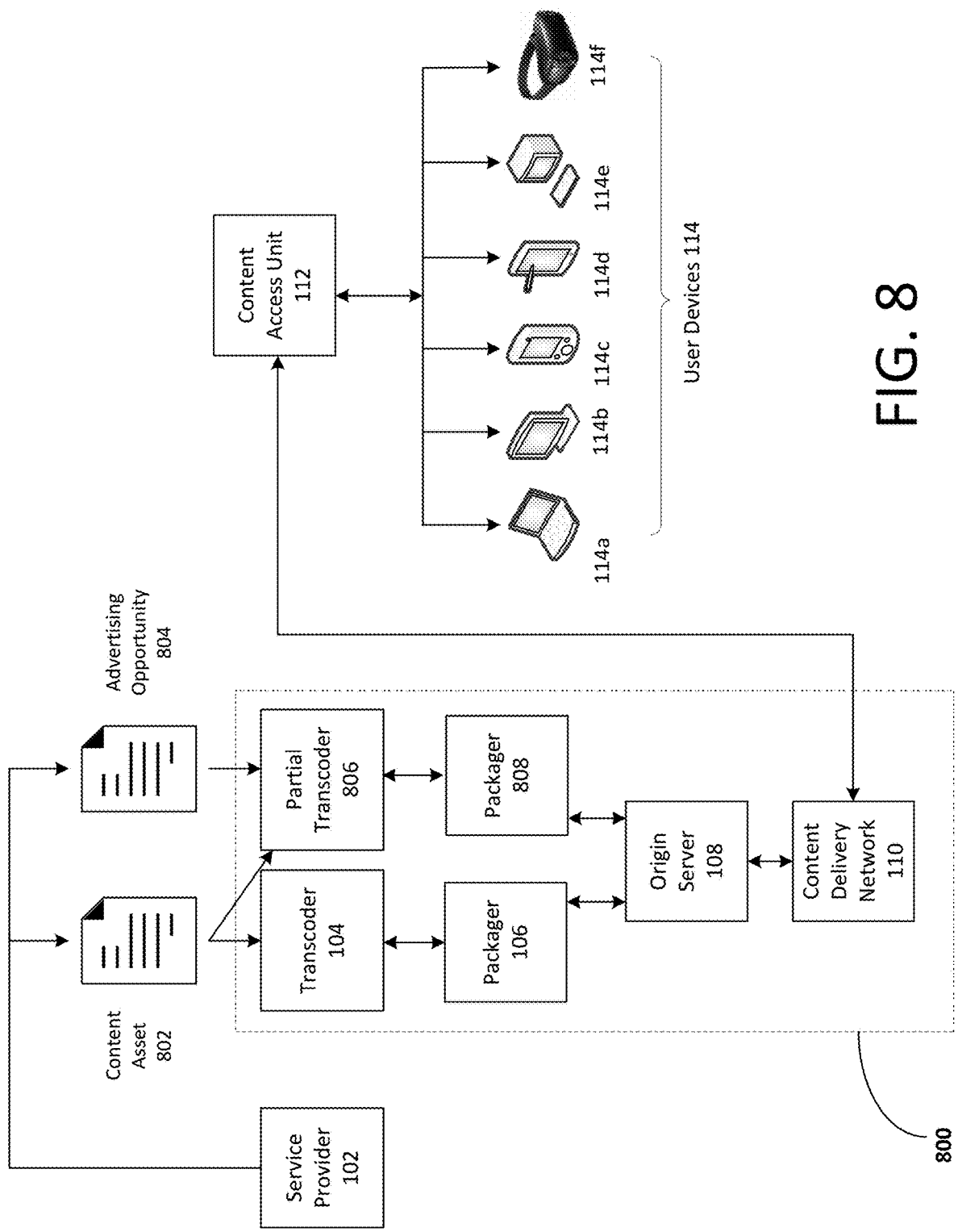
FIG. 8 shows a block diagram of a system in accordance with aspects of the disclosure.

As shown in FIG. 8, the system 100 may comprise a partial transcoder and an additional packager in order to process the portion of content fragments and the received advertising opportunity. For example, content distributor 102 may receive a content asset 802. The content asset 802 may be converted, for example, from one video format to another video format, such as one amenable to the means by which the content distributor's users view the content, by the transcoder 104, as discussed herein in connection with FIG. 1. The content asset may be divided into a plurality of content fragments by a fragmentor associated with the transcoder 104. If the content distributor still has not received an advertising opportunity associated with the content asset 802, the content distributor may make the content asset available without any advertising opportunity via the origin server 108 and the content delivery network 110, as discussed herein in connection with FIG. 1. A user of the system may access the content asset via a user interface associated with the content access unit 112 through any of the user devices 114.

When the content distributor 102 later receives an advertising opportunity, such as advertising opportunity 804, the partial transcoder 806 may be configured to process the content asset 802 and the advertising opportunity 804. The partial transcoder 806 may be similar to transcoder 104 shown in FIG. 1 or may be a transcoder with limited functionality, for example, to process a portion of the content fragments needed to seamlessly insert the advertising opportunity 804 into the content asset 802. As discussed herein, the partial transcoder may only need to process less than one percent of the total number of content fragments. The packager 808 may be configured to insert the advertising opportunity into the plurality of content fragments. The location of the advertising opportunity may be received as part of information associated with the advertising opportunity, or may be determined by the packager 808, content distributor 102, or any of the other components associated with system 800.

The origin server 108 may be configured to update and save the content asset to reflect the changes to the content fragments made by the partial transcoder 806 and the packager 808. Updating the content asset with the advertising opportunity may comprise updating only the advertising opportunity and the adjusted fragments. In contrast to traditional methods, as discussed herein, this may save significant space as the origin does not need to save two copies of the same content asset. The content asset with the advertising opportunities may be sent to a content delivery network (CDN) 110 and made available to a user any of the user devices 114 through the content access unit 112.

The methods and systems associated with processing a portion of the plurality of content fragments, as discussed herein, may comprise generating and updating a manifest associated with the content asset. A manifest file may contain information describing various aspects of the associated content asset that may be useful for the device 114 to playback the content asset and/or for the content distributor 102 to store and retrieve the content asset. For example, a manifest file may indicate each of the plurality of content fragments, the playback duration of each fragment, the number of fragments, and/or the proper ordering of the fragments necessary to effectuate a playback of the content asset.

Figure 9:
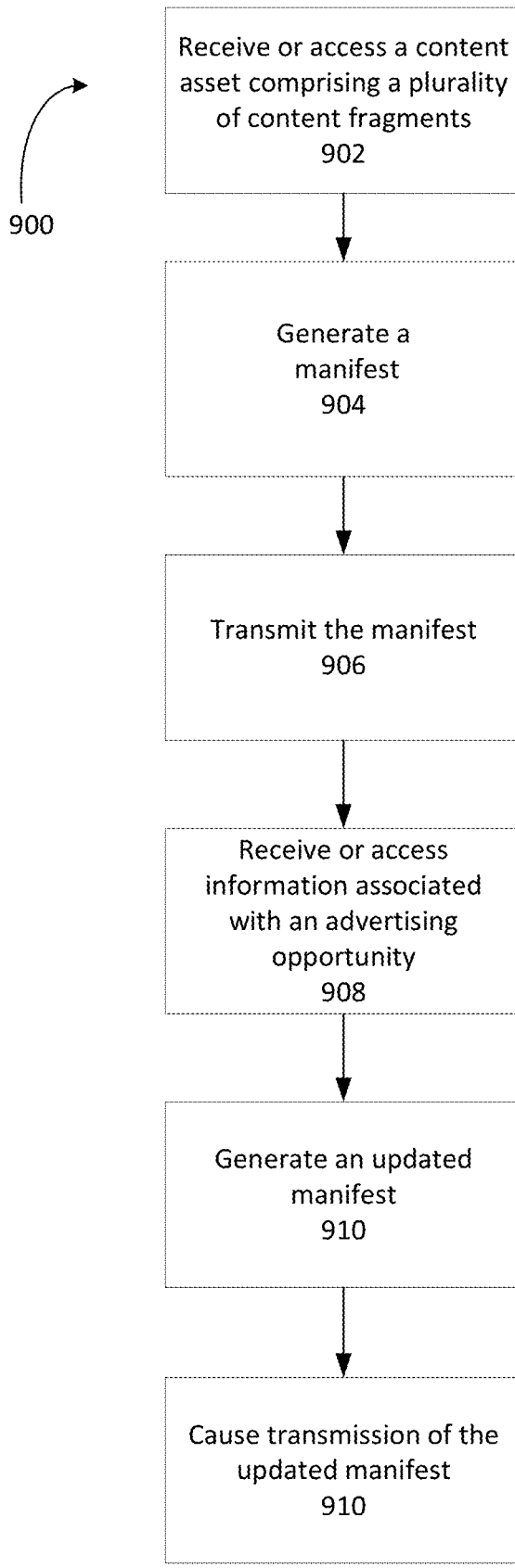
FIG. 9 shows a flow chart of an example method in accordance with aspects of the disclosure.

FIG. 9 shows an example flow chart for a method 900. As shown at step 902, a content asset comprising a plurality of content fragments may be received or accessed. The content asset may be received or accessed, for example, by the content distributor 102 shown in FIG. 1. The plurality of content fragments may be of equal playback duration.

At step 904, a manifest may be generated. The manifest may identify a playback duration of one or more of the plurality of content fragments. The manifest may be generated, for example, by the packager 106 shown in FIG. 1. An example segment of a manifest file describing a plurality of content fragments of equal playback duration is shown below.

```
<SegmentTemplate timescale="90000"
    media="$RepresentationID$-$Number$. ts"
        startNumber=" 1 ">
    <SegmentTimeline>
        <S d=" 180180" r="3952"/>
    </SegmentTimeline>
</SegmentT em plate>
```

As shown in the example shown above, each of the content fragments may be 2.002 seconds long. Thus, for a content asset comprising a playback of 90,000 tics per second, each content asset fragment may comprise 180,180 tics.

At step 906, the manifest may transmitted. Transmitting the manifest may facilitate playback of the content asset by a recipient device, such as any of the user devices 114 shown in FIG. 1. For example, the device 114 may use the manifest file to determine the fragments required to play the program or a portion of the program and subsequently download the required fragments using the network locations specified in the manifest file.

At step 908, information associated with an advertising opportunity may be received. The advertising opportunity may be received, for example, by the content distributor 102 at a time that is different from when the content asset was received. The information associated with the content asset may comprise information indicating a location in the content asset to insert the advertising opportunity. For example, the information associated with the advertising opportunity may contain instructions to insert the advertising opportunity ten minutes into the content asset.

At step 910, the manifest may be updated based on the received information. The updated manifest may identify a first asset fragment having a first playback duration and a second asset fragment having a second playback duration. The first playback duration may be different than the second playback duration. An example segment of manifest describing a content asset having content fragments of different playback durations is shown below.

```
<SegmentTemplate timescale="90000"
    media="$RepresentationID$-$Number$.ts"
        startNumber=" 1 ">
    <SegmentTimeline>
        <S d=" 180180" r="352"/>
        <S t="63603540" d="260270"/>
        <S t="63873710" d="90090/>
        <S t=" 63963900 " d~" 180180 " r="3598"/>
    </SegmentTimeline>
</SegmentTemplate>
```

The manifest may identify at least one of the number of content fragments in the content asset, an ordering of the content fragments, and a file name for each of the content fragments. Updating the manifest may comprise updating at least one of the number of content fragments, the ordering of the content fragments, and a file name for at least one of the content fragments.

Updating the manifest may comprise updating the manifest such that the manifest comprises information associated with the received advertising opportunity. Updating the manifest such that the manifest comprises information associated with the received advertising opportunity may comprise updating the manifest such that the manifest comprises information associated with an advertising opportunity specific to a user requesting playback of the content asset.

Additionally or alternatively, updating the manifest may comprise generating a new manifest. In the event that a new manifest is generated, the new manifest may identify the playback duration of the first asset fragment, the playback duration of the second asset fragment, and the playback duration of the received advertising opportunity. The manifest may also comprise metadata for at least one of the first asset fragment, the second asset fragment, and the advertising opportunity.

The content fragments, after being processed, may be given new identifiers (e.g., new file names). In the case that a new manifest is generated, the manifest may get a new identifier (e.g., a file name). These changes may allow any delivery that has started prior to the reprocessing to complete without being affected by the reprocessing. For example, a content provider may be able to process the content asset when it is received without needing to make it temporarily unavailable in order to update the content asset and corresponding manifest. Once the advertising opportunities are identified, reprocessing is minimized, reducing the time that content needs to be offered without advertisements. This processing may be done in a way that does not disrupt the experience of anyone viewing the content asset throughout the reprocessing.

The methods disclosed herein may be used to replace an old advertisement with a new one. Replacing an existing advertising opportunity may also require updates to the existing manifest. For example, a manifest may already exist for a given content asset, such as a television show. A new manifest may be generated that is specific to a given user of the system. Thus, when Viewer A orders the television show from the content distributor, the content distributor may generate a new manifest which is specific for Viewer A and has advertisements specific for Viewer A. In order to update the manifest for Viewer A for the content asset, the content distributor may generate a manifest mimicking the original manifest up to the first adjusted fragment, then make references to the first adjusted fragment, the advertising opportunity, and the second adjusted fragment, and complete the rest of the manifest mimicking the original manifest. The place where the advertising opportunity exists may be marked with a tag specific to the user, such as an event ID tag.

Figure 10:
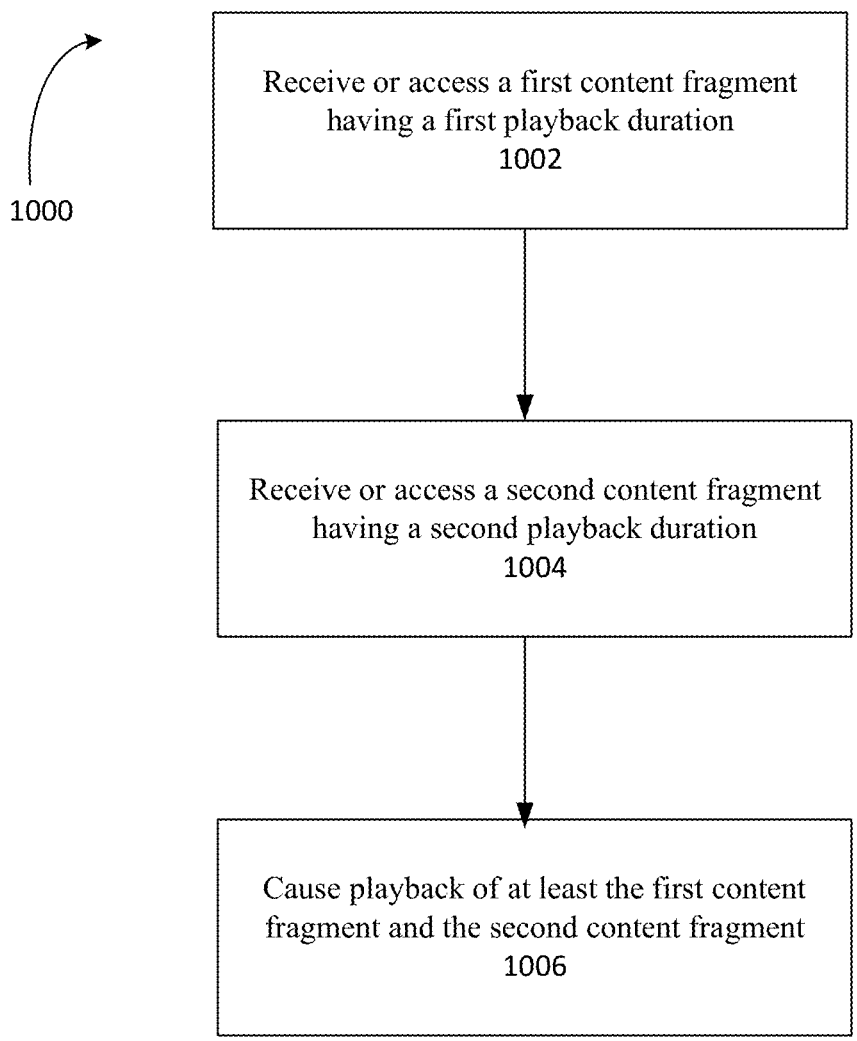
FIG. 10 shows a flow chart of an example method in accordance with aspects of the disclosure.

FIG. 10 shows an example flow chart for a method 1000. As shown at step 1002, a user device may be configured to receive or access a first content asset fragment having a first playback duration. The first content asset fragment may have a playback duration that is identical to a plurality of other content fragments associated with the content asset. For example, as discussed herein, a thirty-minute content asset in the form of a television show may comprise approximately 900 content fragments having a first playback duration, such as, for example, two seconds.

As shown at step 1004, the user device may be configured to receive or access a second content asset fragment having a second playback duration that is different than the first playback duration and is indicative of an advertising opportunity inserted at a boundary between the first content fragment and the second content fragment. For example, the user device may be configured to receive the first content asset fragment, the second content asset fragment, and the advertising opportunity from a computing device associated with the content distributor 102 shown in FIG. 1. The computing device, prior to transmitting the first content asset, the second content asset and the advertising opportunity to the user device, may be configured to select, from a plurality of content fragments having an equal playback duration and based on information associated with the advertising opportunity, the first content asset fragment and the second asset fragment and adjust a playback duration of the first content asset fragment and the second content asset fragment such that the first playback duration is different than the second playback duration. As discussed herein, the computing device may be configured to adjust a playback duration of the second content asset fragment by increasing or decreasing the playback duration of the content asset fragment by no more than 50% in order to insert the advertising opportunity at a boundary between the second content asset fragment without causing a delay in the content.

At step 1006, playback of at least the first content fragment and the second content fragment may be caused. For example, the user device may be configured to cause playback of a plurality of content fragments having an equal playback duration, the first content fragment having a first playback duration and a second content fragment having a second playback duration, the first playback duration and the second playback duration being different than the playback duration of the plurality of content fragments, and the advertising opportunity.

Figure 11:
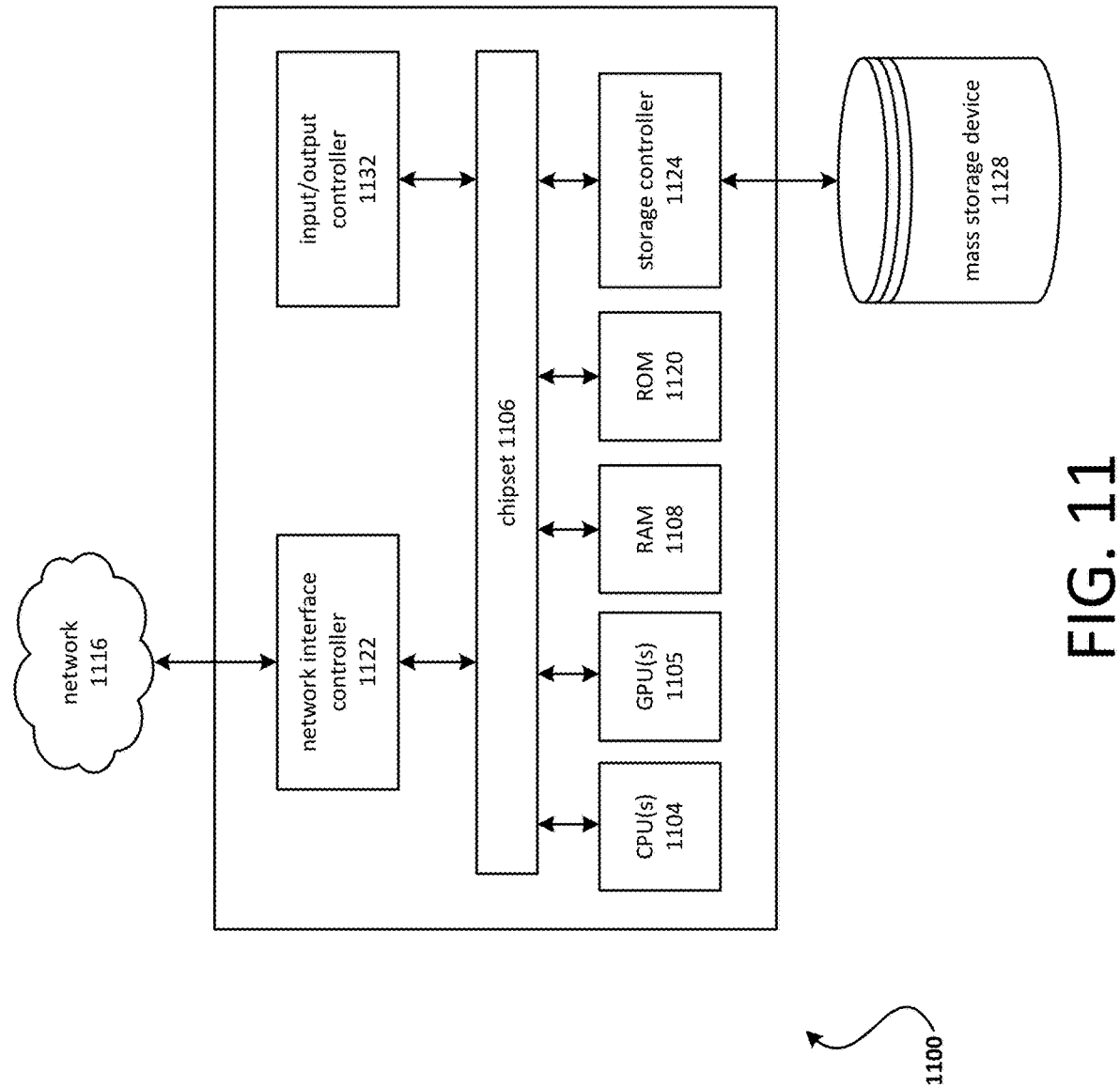
FIG. 11 shows a block diagram of an example computing device.

FIG. 11 depicts a computing device that may be used in various aspects, such as the servers, modules, and/or devices depicted in FIG. 1. With regard to the example architecture of FIG. 1, the transcoder 104, packager 106, origin server 108, content delivery network 110, and/or the content access unit 112 may each be implemented in an instance of a computing device 1100 of FIG. 11. The computer architecture shown in FIG. 11 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 4, 7, 9, and 10.

The computing device 1100 may include a baseboard, or "motherboard," which is a printed circuit board to which a multitude of components or devices may be connected by way of a system bus or other electrical communication paths. One or more central processing units (CPUs) 1104 may operate in conjunction with a chipset 1106. The CPU(s) 1104 may be standard programmable processors that perform arithmetic and logical operations necessary for the operation of the computing device 1100.

The CPU(s) 1104 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to generate more complex logic circuits including registers, adders-subtractors, arithmetic logic units, floating-point units, and the like.

The CPU(s) 1104 may be augmented with or replaced by other processing units, such as GPU(s) 1105. The GPU(s) 1105 may comprise processing units specialized for but not necessarily limited to highly parallel computations, such as graphics and other visualization-related processing.

A chipset 1106 may provide an interface between the CPU(s) 1104 and the remainder of the components and devices on the baseboard. The chipset 1106 may provide an interface to a random access memory (RAM) 1108 used as the main memory in the computing device 1100. The chipset 1106 may provide an interface to a computer-readable storage medium, such as a read-only memory (ROM) 1120 or non-volatile RAM (NVRAM) (not shown), for storing basic routines that may help to start up the computing device 1100 and to transfer information between the various components and devices. ROM 1120 or NVRAM may also store other software components necessary for the operation of the computing device 1100 in accordance with the aspects described herein.

The computing device 1100 may operate in a networked environment using logical connections to remote computing nodes and computer systems through local area network (LAN) 1116. The chipset 1106 may include functionality for providing network connectivity through a network interface controller (NIC) 1122, such as a gigabit Ethernet adapter. A NIC 1122 may be capable of connecting the computing device 1100 to other computing nodes over a network 1116. It should be appreciated that multiple NICs 1122 may be present in the computing device 1100, connecting the computing device to other types of networks and remote computer systems.

The computing device 1100 may be connected to a mass storage device 1128 that provides non-volatile storage for the computer. The mass storage device 1128 may store system programs, application programs, other program modules, and data, which have been described in greater detail herein. The mass storage device 1128 may be connected to the computing device 1100 through a storage controller 1124 connected to the chipset 1106. The mass storage device 1128 may consist of one or more physical storage units. A storage controller 1124 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1100 may store data on a mass storage device 1128 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1128 is characterized as primary or secondary storage and the like.

For example, the computing device 1100 may store information to the mass storage device 1128 by issuing instructions through a storage controller 1124 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1100 may read information from the mass storage device 1128 by detecting the physical states or characteristics of one or more particular locations within the physical storage units.

In addition to the mass storage device 1128 described herein, the computing device 1100 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1100.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1128 depicted in FIG. 11, may store an operating system utilized to control the operation of the computing device 1100. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 1128 may store other system or application programs and data utilized by the computing device 1100.

The mass storage device 1128 or other computer-readable storage media may also be encoded with computer-executable instructions, which, when loaded into the computing device 1100, transforms the computing device from a general-purpose computing system into a special-purpose computer capable of implementing the aspects described herein. These computer-executable instructions transform the computing device 1100 by indicating how the CPU(s) 1104 transition between states, as described herein. The computing device 1100 may have access to computer-readable storage media storing computer-executable instructions, which, when executed by the computing device 1100, may perform the methods described in relation to FIGS. 4, 7, 9, and 10.

A computing device, such as the computing device 1100 depicted in FIG. 11, may also include an input/output controller 1132 for receiving and processing input from a number of input devices, such as a keyboard, a mouse, a touchpad, a touch screen, an electronic stylus, or other type of input device. Similarly, an input/output controller 1132 may provide output to a display, such as a computer monitor, a flat-panel display, a digital projector, a printer, a plotter, or other type of output device. It will be appreciated that the computing device 1100 may not include all of the components shown in FIG. 11, may include other components that are not explicitly shown in FIG. 11, or may utilize an architecture completely different than that shown in FIG. 11.

As described herein, a computing device may be a physical computing device, such as the computing device 1100 of FIG. 11. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Example" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus generate a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are shown as being stored in memory or on storage while being used, and that these items or portions thereof may be transferred between memory and other storage devices for purposes of memory management and data integrity. Additionally or alternatively, in other embodiments, some or all of the software modules and/or systems may execute in memory on another device and communicate with the shown computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as example only, with a true scope and spirit being indicated by the following claims.

What is claimed:

1. A method comprising:
   receiving information associated with an advertising opportunity, wherein the information indicates a location in a content asset to insert the advertising opportunity, wherein the content asset comprises a plurality of content fragments;
   determining, based on the received information, a first modified content fragment having a first playback duration and a second modified content fragment having a second playback duration that is different than the first playback duration, wherein one of the first modified content fragment and the second modified content fragment comprises at least a portion of a first fragment of the plurality of content fragments and at least a portion of a second fragment of the plurality of content fragments; and
   causing sending of the first modified content fragment and the second modified content fragment.

2. The method of claim 1, wherein each of the plurality of content fragments has an equal playback duration that is different than the first playback duration and the second playback duration.

3. The method of claim 2, further comprising causing sending of a stream, the stream comprising the plurality of content fragments having an equal playback duration, the first modified content fragment, the second modified content fragment, and the advertising opportunity.

4. The method of claim 1, further comprising determining a manifest identifying a playback duration of one or more of the plurality of content fragments.

5. The method of claim 1, wherein the information associated with the advertising opportunity is specific to a device requesting playback of the content asset.

6. The method of claim 1, wherein the first modified content fragment comprises at least a portion of the first fragment of the plurality of content fragments and at least a portion of the second fragment of the plurality of content fragments.

7. The method of claim 1, wherein the second modified content fragment comprises at least a portion of the first fragment of the plurality of content fragments and at least a portion of the second fragment of the plurality of content fragments.

8. A method comprising:
   receiving information associated with an advertising opportunity, wherein the information indicates a location in a content asset to insert the advertising opportunity;
   determining a manifest that indicates a plurality of content fragments associated with the content asset;
   determining an updated manifest that indicates a first modified content fragment having a first playback duration and a second modified content fragment having a second playback duration that is different than the first playback duration, wherein one of the first modified content fragment and the second modified content fragment comprises at least a portion of a first fragment of the plurality of content fragments and at least a portion of a second fragment of the plurality of content fragments; and
   causing sending of the updated manifest.

9. The method of claim 8, wherein determining the updated manifest comprises updating the manifest to comprise the information associated with the advertising opportunity.

10. The method of claim 9, wherein determining the updated manifest further comprises updating the manifest to include information associated with an advertising opportunity specific to a recipient device.

11. The method of claim 8, wherein determining the updated manifest comprises creating a new manifest.

12. The method of claim 8, wherein the updated manifest indicates the playback duration of the first modified content fragment, the playback duration of the second modified content fragment, and the playback duration of the advertising opportunity.

13. The method of claim 8, wherein the manifest further indicates a quantity of content fragments, an ordering of the content fragments, and a file name for each of the content fragments.

14. The method of claim 13, wherein determining the updated manifest comprises updating at least one of the quantity of content fragments, the ordering of the content fragments, and the file name for at least one of the content fragments.

15. The method of claim 8, wherein causing sending of the updated manifest comprises causing sending of the updated manifest responsive to determining that a license window has begun.

16. The method of claim 8, wherein the first modified content fragment comprises at least a portion of the first fragment of the plurality of content fragments and at least a portion of the second fragment of the plurality of content fragments.

17. The method of claim 8, wherein the second modified content fragment comprises at least a portion of the first fragment of the plurality of content fragments and at least a portion of the second fragment of the plurality of content fragments.

18. An apparatus comprising:
one or more processors; and
memory storing instructions which, when executed by the one or more processors, cause the apparatus to:
receive information associated with an advertising opportunity, wherein the information indicates a location in a content asset to insert the advertising opportunity, wherein the content asset comprises a plurality of content fragments;
determine, based on the received information, a first modified content fragment having a first playback duration and a second modified content fragment having a second playback duration that is different than the first playback duration, wherein one of the first modified content fragment and the second modified content fragment comprises at least a portion of a first fragment of the plurality of content fragments and at least a portion of a second fragment of the plurality of content fragments; and
cause sending of the first modified content fragment and the second modified content fragment.

19. The apparatus of claim 18, wherein each of the plurality of content fragments has an equal playback duration that is different than the first playback duration and the second playback duration.

20. The apparatus of claim 19, wherein the instructions, when executed, further cause the apparatus to cause sending of a stream, the stream comprising the plurality of content fragments having an equal playback duration, the first modified content fragment, the second modified content fragment, and the advertising opportunity.

21. The apparatus of claim 18, wherein the instructions, when executed, further cause the apparatus to determine a manifest identifying a playback duration of one or more of the plurality of content fragments.

22. The apparatus of claim 18, wherein the information associated with the advertising opportunity is specific to a device requesting playback of the content asset.

23. The apparatus of claim 18, wherein the first modified content fragment comprises at least a portion of the first fragment of the plurality of content fragments and at least a portion of the second fragment of the plurality of content fragments.

24. The apparatus of claim 18, wherein the second modified content fragment comprises at least a portion of the first fragment of the plurality of content fragments and at least a portion of the second fragment of the plurality of content fragments.

25. An apparatus comprising:
one or more processors; and
memory storing instructions which, when executed by the one or more processors, cause the apparatus to:
receive information associated with an advertising opportunity, wherein the information indicates a location in a content asset to insert the advertising opportunity;
determine a manifest that indicates a plurality of content fragments associated with the content asset;
determine an updated manifest that indicates a first modified content fragment having a first playback duration and a second modified content fragment having a second playback duration that is different than the first playback duration, wherein one of the first modified content fragment and the second modified content fragment comprises at least a portion of a first fragment of the plurality of content fragments and at least a portion of a second fragment of the plurality of content fragments; and
cause sending of the updated manifest.

26. The apparatus of claim 25, wherein determining the updated manifest comprises updating the manifest to comprise the information associated with the advertising opportunity.

27. The apparatus of claim 26, wherein determining the updated manifest further comprises updating the manifest to include information associated with an advertising opportunity specific to a recipient device.

28. The apparatus of claim 25, wherein determining the updated manifest comprises creating a new manifest.

29. The apparatus of claim 25, wherein the updated manifest indicates the playback duration of the first modified content fragment, the playback duration of the second modified content fragment, and the playback duration of the advertising opportunity.

30. The apparatus of claim 25, wherein the manifest further indicates a quantity of content fragments, an ordering of the content fragments, and a file name for each of the content fragments.

31. The apparatus of claim 30, wherein determining the updated manifest comprises updating at least one of the quantity of content fragments, the ordering of the content fragments, and the file name for at least one of the content fragments.

32. The apparatus of claim 25, wherein causing sending of the updated manifest comprises causing sending of the updated manifest responsive to determining that a license window has begun.

33. The apparatus of claim 25, wherein the first modified content fragment comprises at least a portion of the first fragment of the plurality of content fragments and at least a portion of the second fragment of the plurality of content fragments.

34. The apparatus of claim 25, wherein the second modified content fragment comprises at least a portion of the first fragment of the plurality of content fragments and at least a portion of the second fragment of the plurality of content fragments.

* * * * *